(12) United States Patent
Pölzl et al.

(10) Patent No.: US 8,439,372 B2
(45) Date of Patent: May 14, 2013

(54) HYDRAULIC PROTECTION OF A ROLLING STABILIZATION SYSTEM

(75) Inventors: Stephan Pölzl, Eckental (DE); Andreas Zell, Nürnberg (DE)

(73) Assignee: Conti Temic Microelectronic GmbH (DE)

( * ) Notice: Subject to any disclaimer, the term of this patent is extended or adjusted under 35 U.S.C. 154(b) by 229 days.

(21) Appl. No.: 12/863,036

(22) PCT Filed: Nov. 13, 2008

(86) PCT No.: PCT/DE2008/001871
§ 371 (c)(1),
(2), (4) Date: Sep. 24, 2010

(87) PCT Pub. No.: WO2009/089809
PCT Pub. Date: Jul. 23, 2009

(65) Prior Publication Data
US 2011/0006492 A1    Jan. 13, 2011

(30) Foreign Application Priority Data

Jan. 18, 2008    (DE) .................. 10 2008 004 913

(51) Int. Cl.
*B60G 17/005*    (2006.01)
*B60G 17/018*    (2006.01)

(52) U.S. Cl.
USPC .............. 280/5.502; 280/124.106; 280/5.506; 280/124.16

(58) Field of Classification Search ........... 701/38, 701/39; 280/124.106, 5.502, 5.506, 5.508, 280/124.16, 124.161
See application file for complete search history.

(56) References Cited

U.S. PATENT DOCUMENTS

| 4,834,419 | A | | 5/1989 | Kozaki et al. |
| 5,735,540 | A | * | 4/1998 | Schiffler .................. 280/5.501 |
| 6,039,326 | A | | 3/2000 | Agner |
| 7,871,082 | B2 | * | 1/2011 | Zuurbier et al. .......... 280/5.508 |
| 2006/0038370 | A1 | | 2/2006 | Doerr et al. |
| 2008/0111325 | A1 | | 5/2008 | Grethel et al. |
| 2009/0115147 | A1 | * | 5/2009 | Zuurbier et al. .......... 280/5.506 |
| 2009/0138156 | A1 | | 5/2009 | Kesselgruber et al. |

FOREIGN PATENT DOCUMENTS

| DE | 41 18 823 | 12/1992 |
| DE | 196 46 500 | 1/1998 |
| DE | 103 34 705 | 2/2004 |
| DE | 103 14 251 | 10/2004 |
| DE | 10 2004 012 545 | 8/2005 |
| DE | 10 2006 004 264 | 8/2007 |
| GB | 2 393 160 | 7/2003 |
| JP | 2004-1 14 876 | 4/2004 |
| JP | 2005-3 19 833 | 11/2005 |
| WO | WO 2006/058747 | 6/2006 |
| WO | WO 2006/105753 | 10/2006 |

OTHER PUBLICATIONS

International Search Report for PCT/DE2008/001871 dated Apr. 1, 2009.
German Search Report for DE 10 2008 004 913.1 dated Jul. 31, 2008.

* cited by examiner

*Primary Examiner* — Ruth Ilan
(74) *Attorney, Agent, or Firm* — RatnerPrestia

(57) ABSTRACT

A device for the protection of a rolling stabilization system for motor vehicles, having at least two stabilization devices includes at least one first hydraulically triggerable safety valve for locking at least the first stabilization device.

8 Claims, 1 Drawing Sheet

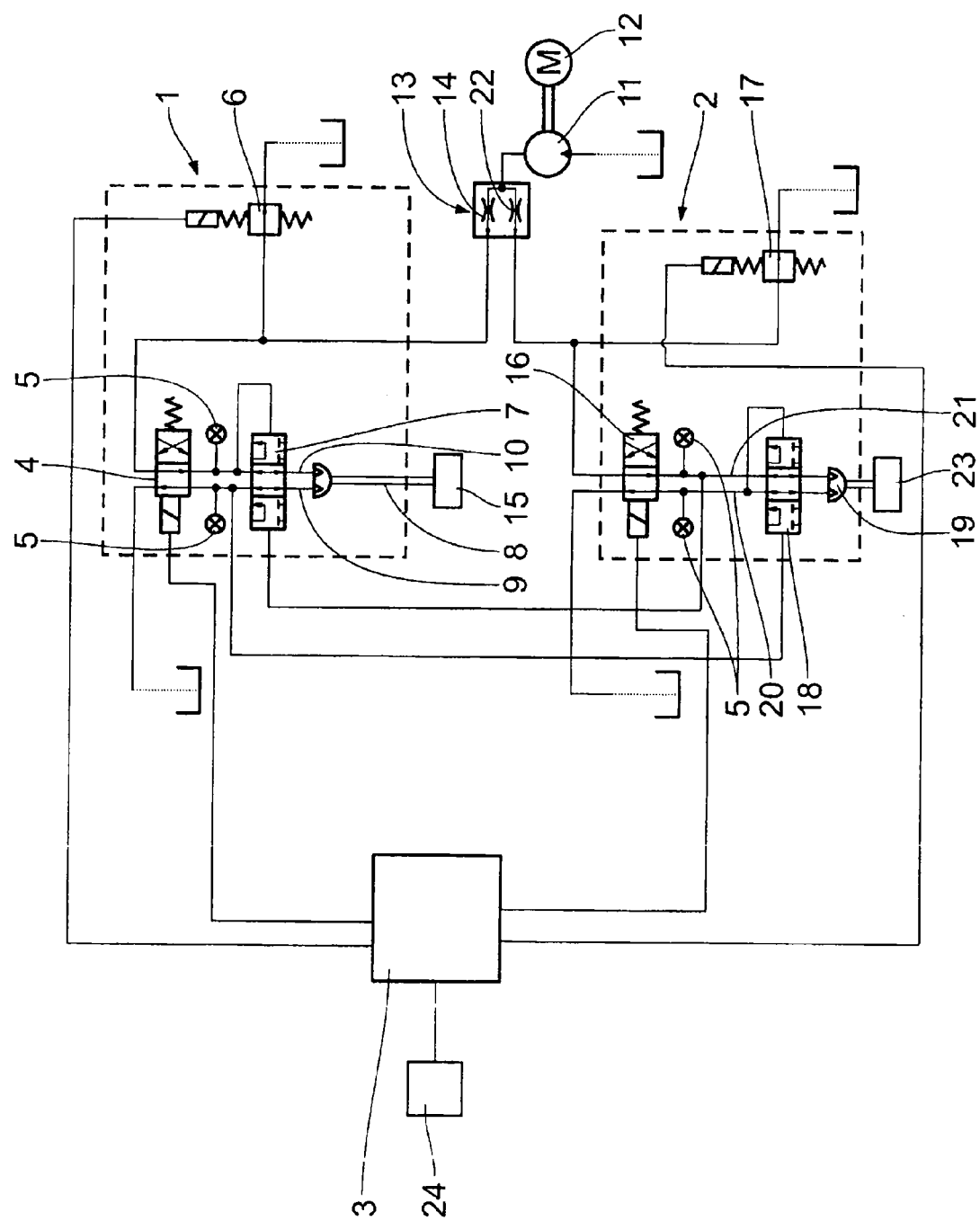

HYDRAULIC PROTECTION OF A ROLLING STABILIZATION SYSTEM

CROSS-REFERENCE TO RELATED APPLICATIONS

This application is the U.S. national phase application of PCT International Application No. PCT/DE2008/001871, filed Nov. 13, 2008, which claims priority to German Patent Application No. DE 10 2008 004 913.1, filed Jan. 18, 2008, the contents of such applications being incorporated herein by reference.

FIELD OF THE INVENTION

The invention relates to a device for the protection of a rolling stabilization system for motor vehicles. The invention furthermore relates to a method for the protection of a rolling stabilization system.

BACKGROUND OF THE INVENTION

In active rolling stabilization systems on motor vehicles, actuating elements are activated by an electronic control unit in such a way that active stabilizers at the axles right the vehicle. In these systems, stabilizers are generally provided at the front axle and at the rear axle of the vehicle. During cornering, both stabilizers are supposed to support the vehicle body on the side which is on the outside of the curve. Activation of the stabilizers of the front and rear axle on opposite sides relative to the direction of travel creates critical problems in terms of vehicle dynamics and must therefore be avoided at all costs. When using separate stabilization devices for each axle, their correct functioning is therefore generally monitored by an electronic control device. This imposes demanding requirements on the functional reliability of this control device.

SUMMARY OF THE INVENTION

It is an object of the present invention to provide protection for a rolling stabilization system for motor vehicles which is hydraulically controlled. This reduces the demands on the functional reliability of the electronic control device.

The crux of the invention lies in protecting a rolling stabilization system by means of a hydraulically triggerable safety valve which is triggered automatically when a predetermined trigger condition is fulfilled, at least partially locks the rolling stabilization system and thus prevents situations that are critical in terms of vehicle dynamics.

A second hydraulically triggerable safety device for locking the second stabilization device increases safety even further.

The design of the safety device as a safety valve is particularly economical and efficient.

A signal transmitting connection between the safety valve and a pressure sensor increases the flexibility and operability of the device.

An electric unlocking facility for the safety device simplifies the process of resetting it to the active state.

An electric control unit enables precise and flexible control of the directional valves.

The arrangement of the device at the axles of a motor vehicle leads to increased driving comfort and improved driving safety.

The fact that the safety device is triggered by the method according to aspects of the invention as a function of a trigger condition makes it possible to adapt the method in a variable manner to different conditions.

The automatic triggering of the safety device if a predetermined difference between the actuating effect exerted on the first axle by the first stabilization device and the actuating effect exerted on the second axle by the second stabilization device, is particularly simple to implement and leads in an effective manner to the prevention of situations that are critical in terms of vehicle dynamics.

BRIEF DESCRIPTION OF THE DRAWINGS

Further features and details of the invention will emerge from the description of an illustrative embodiment with reference to the drawing. FIG. 1 shows a schematic representation of the device according to aspects of the invention.

DETAILED DESCRIPTION

A device for the protection of a rolling stabilization system for motor vehicles comprises a first hydraulic stabilization device 1, at least one second hydraulic stabilization device 2 and an electronic control unit 3. In particular, the electronic control unit 3 is programmable. The first hydraulic stabilization device 1 comprises a first directional valve 4, two pressure sensors 5, a first proportional valve 6, a first safety valve 7 and a first swivel motor 8. The first directional valve 4 is controllable, in particular by means of the electronic control unit 3. For this purpose, the electronic control unit 3 is in signal transmitting connection with the first directional valve 4. The first directional valve 4 has two flow paths. The direction of flow can be controlled by means of the electronic control unit 3. The first directional valve can have a mechanical return device.

The first hydraulic stabilization device 1 furthermore comprises a first hydraulic line 9 and a second hydraulic line 10. The hydraulic lines 9, 10 can be subjected hydraulically to pressure by a pump 11 with a motor 12 via a flow divider 13 with a first throttle valve 14. The motor 12 is generally the drive unit of the vehicle. The maximum achievable pressure in the hydraulic lines 9, 10 can be regulated by means of the pump 11 and the first throttle valve 14 in the flow divider 13. The pressure actually prevailing in the hydraulic lines 9, 10 can be regulated by means of the electronic control unit 3 by way of the controllable first proportional valve 6. The proportional valve 6 is in signal transmitting connection with the electronic control unit 3.

The pressure sensors 5 are each arranged in the hydraulic lines 9, 10 between the first directional valve 4 and the first swivel motor 8.

The first directional valve 4 has two positions. The first position corresponds to a first direction of action of the pressure prevailing in the hydraulic lines 9, 10 on the first swivel motor 8, while the second position corresponds to a direction of action on the swivel motor 8 opposite to that of the first direction of action. The magnitude of the pressure acting on the swivel motor 8 can therefore be regulated by the electronic control unit 3 by means of the first proportional valve 6, while the direction of action can be controlled by means of the first directional valve 4.

The swivel motor 8 is one specific embodiment of an actuator for exerting a stabilizing moment on a first axle 15. The first axle 15 is, in particular, the front axle of a motor vehicle. Alternative actuating elements are likewise possible. The precise way in which the swivel motor 8 is coupled to the first axle 15 is not shown in FIG. 1. The swivel motor 8 can be used to exert a torsional moment on a bending rod (not shown in FIG. 1), leading to a stabilizing moment about the longitudinal axis of the vehicle.

The second hydraulic stabilization device 2 is of substantially identical construction to the first hydraulic stabilization device 1, to the description of which reference is made herewith. In particular, it comprises a second directional valve 16, pressure sensors 5, a second proportional valve 17, a second safety valve 18, a second swivel motor 19, a third and a fourth hydraulic line 20, 21, the hydraulic lines 20, 21 being subjected to pressure by the pump 11 via the flow divider 13 with a second throttle valve 22. The throttle valves 14 and 22 can be adjusted independently of one another. The maximum achievable pressure in the first and second hydraulic lines 9, 10 of the first stabilization device 1 can thus be different to that in the third and fourth hydraulic lines 20, 21 of the second stabilization device 2. The second swivel motor 19 is coupled to a second axle 23 for the purpose of exerting a stabilizing moment. The second axle 23 is, in particular, the rear axle of a motor vehicle.

The hydraulically triggerable safety device for locking the first stabilization device 1 will be described below. The safety device comprises the first safety valve 7. The first safety valve 7 is arranged in the hydraulic lines 9, 10 between the first directional valve 4 and the first swivel motor 8. It has a first position, in which the first swivel motor 8 is in direct hydraulic connection with the first directional valve 4. The first safety valve 7 furthermore has at least one further position, in which the first swivel motor 8 is decoupled from the first directional valve 4, i.e. can no longer be subjected to pressure by means of the hydraulic lines 9, 10. In this position of the first safety valve 7, the first swivel motor 8 is locked in a neutral position, i.e. the active stabilizing moment exerted on the first axle 5 by the swivel motor 8 in this position is at most negligibly small.

The trigger mechanism of the first safety valve 7 is connected hydraulically to at least one of the hydraulic lines 9, 10 of the first stabilization device 1 and to at least one of the hydraulic lines 20, 21 of the second stabilization device 2. In the illustrative embodiment shown in FIG. 1, the trigger mechanism of the first safety valve 7 is connected hydraulically to the second hydraulic line 10 of the first stabilization device 1 and to the fourth hydraulic line 21 of the second stabilization device 2, which is the hydraulic line corresponding thereto, i.e. the hydraulic line arranged on the same side relative to a longitudinal axis (not shown) of the vehicle. The first safety valve 7 is designed in such a way that it is triggered automatically if a predetermined difference between the pressure in the second hydraulic line 10 and that in the fourth hydraulic line 21 is exceeded, i.e. it changes from the first, free position, in which the first swivel motor 8 can be subjected to pressure by means of the hydraulic lines 9, 10, into the second position, in which the first swivel motor 8 is locked in a neutral position. It is advantageous if the safety valve 7 can additionally be triggered electrically. In a preferred embodiment, the first safety valve 7 can be unlocked electrically after triggering, i.e. can be returned from the second position to the first position. For this purpose, it is possible, in particular, to provide a signal transmitting connection between the electronic control unit 3 and the first safety valve 7.

In another embodiment (not shown), the first safety valve 7 is in at least indirect signal transmitting connection with at least one of the pressure sensors 5 of the first stabilization device 1 and at least one of the pressure sensors 5 of the second stabilization device 2. In particular, provision is made to enable the first safety valve 7 to be triggerable by means of an actuator (not shown in FIG. 1) controllable by the pressure sensors 5 as well as to be hydraulically triggerable. The actuator can preferably be in signal transmitting connection with the electronic control unit 3.

As regards the arrangement and operation of the second safety valve 18 in the second stabilization device 2, attention is drawn to the corresponding description of the first safety valve 7.

The trigger mechanism of the second safety valve 18 is, in particular, connected hydraulically to the first hydraulic line 9 of the first stabilization device 1 and to the third hydraulic line 20 of the second stabilization device 2, which is the hydraulic line corresponding thereto, i.e. the hydraulic line arranged on the same side relative to a longitudinal axis of the vehicle. It is used, in particular, to lock the second swivel motor 19. The trigger mechanism of the second safety valve 18 can also be connected hydraulically to the same hydraulic lines as that of the first safety valve 7.

In an alternative, simpler embodiment, the second safety valve 18 can be omitted. Such an embodiment has only the first safety valve 7 for locking the swivel motor 8 at the first axle 15, i.e. the front axle of a motor vehicle.

Also provided is at least one sensor 24 (shown only schematically in FIG. 1), which is in signal transmitting connection with the electronic control unit 3. By means of the at least one sensor 24, the electronic control unit 3 can be supplied with data relevant to the vehicle dynamics for the purpose of determining the stabilizing moment to be exerted on the axles 15, 23. This sensor can also transmit all or some of its data via a communication bus or can comprise a further electronic control unit which transmits data.

Of course, the device can be adapted to protect a rolling stabilization system with more than two axles and associated stabilization devices.

The operation of the device according to aspects of the invention will be described below. First of all, a pressure is built up in the hydraulic lines 9, 10 and 20, 21 by means of the pump 11 via the flow divider 13 with the first throttle valve 14 and the second throttle valve 22. The maximum achievable pressure can be regulated by means of the throttle valves 14 and 22 respectively.

While the vehicle is being driven, the at least one sensor 24 supplies the electronic control unit 3 with relevant data relating to the state of the vehicle in terms of vehicle dynamics. From these data, the electronic control unit 3 determines the stabilizing moment to be exerted on the first axle 15 and on the second axle 23, respectively.

The electronic control unit 3 controls the pressure in the hydraulic lines 9, 10 as a function of the data from the at least one sensor 24, by means of the first proportional valve 6, and the direction of action of the pressure on the first swivel motor 8 by means of the first directional valve 4. The electronic control unit 3 controls the pressure in the hydraulic lines 20, 21 in a corresponding manner, by means of the second proportional valve 17, and the direction of action of the pressure on the second swivel motor 19 by means of the second directional valve 16. This makes it possible to avoid unwanted tilting of the vehicle relative to the longitudinal axis of the vehicle, especially when cornering, through appropriate compensation of the support of the vehicle at the axles 15, 23. In the initial state, the first safety valve 7 is open and allows free flow in the hydraulic lines 9, 10 in both directions. In the initial state, the second safety valve 18 is correspondingly open and allows free flow in the hydraulic lines 20, 21 in both directions. However, if a trigger condition is fulfilled, the first safety valve 7 is triggered and locks the first swivel motor 8 in a neutral position. It is advantageous if the second safety valve 18 is also triggered when the trigger condition is fulfilled and locks the second swivel motor 19 in a neutral position. In particular, the trigger conditions for the first safety valve 7 and the second safety valve 18 are identical. However, they can also be different. In the locked position of the safety valve 7, the swivel motor 8 cannot be subjected to pressure. In this state, the first stabilization device 1 does not exert an active stabilizing moment on the first axle 15. In corresponding fashion, the second swivel motor 19 cannot be subjected to pressure in the locked position of the safety valve 18. In this state, the second stabilization device 2 does not exert an active stabilizing moment on the second axle 23. The safety valves 7, 18 are triggered, in particular, if a predetermined difference between the actuating effect exerted on the first axle 15 by the first stabilization device 1 and the actuating effect exerted on the second axle 23 by the second stabilization device 2 is exceeded. Since the actuating effect exerted by the swivel motors 8 and 19 on the respectively associated axles 15 and 23 is dependent on the pressure in the hydraulic lines 9, 10 and 20, 21 respectively, a difference in the actuating effect can be measured as a pressure difference in the corresponding hydraulic lines 9, 20 and 10, 21 respectively. If a predetermined pressure difference in the respective hydraulic lines 10, 21 is exceeded, the first safety valve 7 is triggered automatically in a hydraulically controlled manner. In corresponding fashion, if a predetermined pressure difference in the respective hydraulic lines 9, 20 is exceeded, the second safety valve 18 is triggered automatically in a hydraulically controlled manner. After triggering, the first safety valve and the second safety valve 18 can preferably be unlocked electrically.

The automatic hydraulic triggering of the safety valves 7, 18 reduces the demands on the functional reliability of the electronic control unit 3.

The invention claimed is:

1. A device for protecting a rolling stabilization system of a motor vehicle, comprising
 (a) a first hydraulic stabilization device, having
  (i) a controllable first directional valve, and
  (ii) a first actuator, which is in signal transmitting connection with the first directional valve, for exerting a stabilizing moment on a first axle,
 (b) a second hydraulic stabilization device, having
  (i) a controllable second directional valve, and
  (ii) a second actuator, which is in signal transmitting connection with the second directional valve, for exerting a stabilizing moment on a second axle, and
 (c) at least one hydraulically triggerable safety device for locking at least the first stabilization device in response to a difference in hydraulic pressure between the first hydraulic stabilization device and the second hydraulic stabilization device.

2. The device as claimed in claim 1 further comprising a second hydraulically triggerable safety device for locking at least the second stabilization device.

3. The device as claimed in claim 1, wherein the at least one hydraulically triggerable safety device comprises at least one safety valve.

4. The device as claimed in claim 3, wherein the at least one safety valve is in either indirect or direct signal transmitting connection with at least one pressure sensor.

5. The device as claimed in claim 1, wherein the safety device is configured to be triggered electrically and/or unlocked electrically.

6. The device as claimed in claim 1 further comprising an electric control unit for controlling the directional valves.

7. The device as claimed in claim 1, wherein the first axle is a front axle of a motor vehicle.

8. The device as claimed in claim 1, wherein the second axle is a rear axle of a motor vehicle.

* * * * *

UNITED STATES PATENT AND TRADEMARK OFFICE
CERTIFICATE OF CORRECTION

PATENT NO. : 8,439,372 B2  Page 1 of 1
APPLICATION NO. : 12/863036
DATED : May 14, 2013
INVENTOR(S) : Pölzl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this
Eighth Day of September, 2015

Michelle K. Lee
*Director of the United States Patent and Trademark Office*